(12) United States Patent
Kinning et al.

(10) Patent No.: US 7,229,687 B2
(45) Date of Patent: *Jun. 12, 2007

(54) RELEASE COMPOSITIONS AND ARTICLES MADE THEREFROM

(75) Inventors: David J. Kinning, Woodbury, MN (US); Audrey A. Sherman, St. Paul, MN (US); Jeffrey J. Schwab, Inver Grove Heights, MN (US); Patrick S. Seleski, Harris, MN (US); Wendi J. Winkler, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 51 days.

This patent is subject to a terminal disclaimer.

(21) Appl. No.: 11/137,769

(22) Filed: May 25, 2005

(65) Prior Publication Data

US 2005/0214531 A1    Sep. 29, 2005

Related U.S. Application Data (62) Division of application No. 10/334,962, filed on Dec. 31, 2002, now Pat. No. 6,919,405.

(51) Int. Cl.
  B32B 7/12      (2006.01)
  B32B 15/04     (2006.01)
  B32B 15/082    (2006.01)
  B32B 15/085    (2006.01)
  B32B 15/095    (2006.01)

(52) U.S. Cl. .......... 428/343; 428/352; 428/355 R; 428/355 AC (58) Field of Classification Search .......... 428/343, 428/352, 355 R, 355 AC
See application file for complete search history.

(56) References Cited

U.S. PATENT DOCUMENTS

| | | |
|---|---|---|
| 2,532,011 A | 11/1950 | Dahlquist et al. |
| 2,607,711 A | 8/1952 | Hendricks |
| 2,736,721 A | 2/1956 | Dexter |
| 3,011,988 A | 12/1961 | Luedke et al. |
| 3,437,622 A | 4/1969 | Dahl |
| 3,718,712 A | 2/1973 | Tushaus |
| 4,379,806 A | 4/1983 | Korpman |
| 4,545,843 A | 10/1985 | Bray |
| 4,728,571 A | 3/1988 | Clemens et al. |
| 4,922,113 A | 5/1990 | Melancon |
| 5,108,815 A | 4/1992 | Adams et al. |
| 5,154,962 A | 10/1992 | Mertens et al. |
| 5,162,150 A | 11/1992 | Buis et al. |
| 5,209,971 A | 5/1993 | Babu et al. |
| 5,214,119 A | 5/1993 | Leir et al. |
| 5,229,179 A | 7/1993 | Kumar et al. |
| 5,525,375 A | 6/1996 | Wang et al. |
| 5,591,820 A | 1/1997 | Kydonieus et al. |
| 5,641,835 A | 6/1997 | Smith et al. |
| 5,700,571 A | 12/1997 | Logue et al. |
| 5,728,469 A | 3/1998 | Mann et al. |
| 6,146,756 A | 11/2000 | Ausen et al. |
| 6,348,262 B1 | 2/2002 | Huffman |
| 6,352,766 B1 | 3/2002 | Crandall et al. |
| 6,372,342 B1 | 4/2002 | Karaoglu |
| 6,921,729 B2 * | 7/2005 | Schwab et al. ............ 442/43 |
| 2004/0127121 A1 | 7/2004 | Schwab et al. |

FOREIGN PATENT DOCUMENTS

| | | |
|---|---|---|
| EP | 0 484 093 A2 | 5/1882 |
| WO | WO 00/61693 | 10/2000 |
| WO | WO 00/75210 A1 | 12/2000 |
| WO | WO 01/72918 A1 | 10/2001 |

OTHER PUBLICATIONS

Ciba UVITEX OB Fluorescent Whitening Agent, Printed Nov. 1999, 2 pages.
ExxonMobil LD 129 Low Density Polyethylene for Cast Overwrap Film, Printed Oct. 20, 1999, 1 page.

* cited by examiner

Primary Examiner—Nathan M. Nutter
(74) Attorney, Agent, or Firm—David B. Patchett (57) ABSTRACT

The invention relates to compatibilized release compositions useful in release layers of release articles (e.g., release liners) and adhesive articles (e.g., pressure sensitive adhesive tapes). The compatibilized release compositions comprise a mixture of a thermoplastic olefin-based polymer comprising an acid or a base functionality and a polymeric release material comprising an acid or a base functionality. The functionality of the thermoplastic olefin-based polymer and the functionality of the polymeric release material are selected to provide an acid-base interaction.

11 Claims, 3 Drawing Sheets

RELEASE COMPOSITIONS AND ARTICLES MADE THEREFROM

CROSS REFERENCE TO RELATED APPLICATION

This application is a divisional of U.S. application Ser. No. 10/334,962, filed Dec. 31, 2002, now U.S. Pat. No. 6,919,405, the disclosure of which is herein incorporated by reference.

FIELD

The invention relates to release compositions useful in release layers of release articles (e.g., release liners) and adhesive articles (e.g., pressure sensitive adhesive tapes).

BACKGROUND

Polymeric release materials are known to be used in release layers in release articles (e.g., release liners) and adhesive articles (e.g., adhesive tapes) in order to provide a surface from which an adhesive can be easily and cleanly removed. For example, it is known to apply a polymeric release material to the back surface of an adhesive tape (e.g., a box sealing tape) in order to allow the tape to be provided in roll form and to be easily and conveniently dispensed by unwinding the roll.

One commonly used method of forming a release layer is to coat the release material from a solvent-based solution onto a substrate. After the solution has been applied to the substrate, the solvent is evaporated leaving behind a relatively uniform coating of the release material.

As environmental regulations tighten, release materials that can be processed using solvent-free processes are more desirable. One method by which release materials can be formed into layers without solvent emission is by extrusion. In an extrusion process, a 100% solids release material is heated to a melt and is forced through an extrusion die under pressure to form a release layer. The few examples of extrudable 100% solids release compositions generally include, in addition to the polymeric release material, one or more other polymeric materials which act as carriers for the release agent.

For efficient manufacturing, it is generally preferred that the various components making up the release material composition can be directly fed into an extruder as separate materials. If this is not possible, then the various components must first be pre-blended in a separate process, and the pre-blended material pelletized to provide a homogeneous feed material for the extruder. This pre-blending and pelletizing adds additional cost to the final product, which is not desirable.

In view of the foregoing, release compositions that can be fed directly into an extruder without pre-blending of the components making up the release composition are desirable.

SUMMARY

The present invention provides release compositions that are compatibilized according to a compatibilization scheme. Advantageously, certain embodiments of the release compositions can be fed directly into an extruder without pre-blending of the components making up the release composition. In addition, certain embodiments of release compositions of the present invention may be resistant to the transfer of the polymeric release material, for example, to a pressure sensitive adhesive removed from a release layer comprising the release composition.

In one aspect the present invention provides release compositions comprising a mixture of: (a) a thermoplastic olefin-based polymer comprising an acid or a base functionality, and (b) a polymeric release material comprising an acid or a base functionality. The functionality of the thermoplastic olefin-based polymer and the functionality of the polymeric release material are selected to provide an acid-base interaction that compatibilizes the thermoplastic olefin-based polymer with the polymeric release material. For example, according to the compatibilization scheme, the thermoplastic olefin-based polymer may be acid functionalized and the polymeric release material base functionalized. Alternatively, the thermoplastic olefin-based polymer may be base functionalized and the polymeric release material acid functionalized.

Representative examples of the polymeric release material include polyvinyl N-alkyl carbamates, polyvinyl N-alkyl carbamides, poly alkyl(meth)acrylate copolymers, silicone polyurea segmented copolymers, and siloxane-acrylate block or graft copolymers. In certain embodiments the polymeric release material comprises from about 1% to about 30% by weight of the release composition. In certain preferred embodiments, the polymeric release material is polyvinyl octadecyl carbamate.

Representative examples of acid-modified thermoplastic olefin-based polymer include ethylene/acrylic acid copolymers, ethylene/methacrylic acid copolymers, and acid-modified ethylene/vinyl acetate copolymers. Representative examples of base-modified thermoplastic olefin-based polymers include ethylene/vinyl acetate copolymers. In certain embodiment the thermoplastic olefin-based polymer comprises about 1% to about 99% by weight of the release composition, more typically comprising about 70% to about 99% by weight of the release composition. In certain embodiments, the thermoplastic olefin-based polymer is an ethylene/acrylic acid copolymer comprising about 3% to about 20% by weight acrylic acid.

Release composition of the present invention may further include a diluent polymer. Examples of diluent polymers include polyolefins (e.g., polyethylene) or polyolefin copolymers (e.g., ethylene/propylene copolymers). In embodiments including a diluent polymer, the diluent polymer typically comprises about 40% to about 98% by weight of the release composition with the thermoplastic olefin-containing polymer typically comprising about 1% to about 60% by weight of the release composition, and the polymeric release material typically comprising about 1% to about 30% by weight of the release composition.

In another aspect the present invention provides release articles comprising a substrate having a surface that is at least partially coated with a release layer comprising a release composition of the present invention. Examples of release articles include single and two-sided release liners for pressure sensitive adhesives.

Examples of substrates include paper, metal foil, polymer, polymer film, cellulose acetate, woven substrate or nonwoven substrates. In certain embodiments the substrate is a film that may comprise one or more individual layers and may be extruded or cast. In certain embodiments the release layer and the substrate are co-extruded, for example, using a blown film process. Optionally, a tie layer may be interposed between the substrate and the release layer to improve adhesion.

In another aspect the present invention provides adhesive articles comprising a substrate having a first surface and a second surface; a release layer comprising a release composition of the present invention, and an adhesive layer covering at least a portion of the second surface of the substrate. In certain embodiments the substrate is a film substrate that may comprise one or more individual layers and may be extruded or cast. In certain embodiments the adhesive is a pressure sensitive adhesive that covers one major surface of the substrate with the release material covering the opposite major surface of the substrate. Examples of pressure sensitive adhesives include those based on natural rubbers, synthetic rubbers, styrene block copolymers, polyvinyl ethers, poly(meth)acrylates, poly-α-olefins, polysiloxanes, polyurethanes and polyureas. Examples of adhesive articles having pressure sensitive adhesives include adhesive tapes, for example, packaging tapes, duct tapes and the like.

The above summary is not intended to describe each disclosed embodiment or every implementation of the present invention. The following detailed description more particularly exemplifies these embodiments.

BRIEF DESCRIPTION OF THE DRAWINGS

The invention will be further explained with reference to the figures, wherein.

The figures are intended to be merely illustrative, are not to scale, and are not limiting of the invention.

DETAILED DESCRIPTION

The invention provides release compositions that may be used to form release layers in release articles and adhesive articles. As used herein the term "release layer" refers to a layer that has release properties relative to adhesives, for example, pressure sensitive adhesives. As used herein the term "release article" refers to an article having a substrate and at least one release layer. Representative examples of release articles include single and two-sided release liners. As used herein the term "adhesive article" refers to an article having a substrate, at least one adhesive layer, and at least one release layer. Representative examples of adhesive articles include adhesive tapes (e.g., masking tape, duct tapes, packaging tapes) and "POST-IT" brand notes. Release articles and adhesive articles of the present invention include at least one release layer comprising a release composition of the present invention.

Release compositions of the present invention are compatibilized compositions that comprise: an olefin-based polymer, a polymeric release material, and an optional diluent polymer. As used herein the term "compatibilized" means that materials making up the release composition form a stable multiphase morphology wherein the phases do not significantly coalesce and/or increase in size upon aging at temperatures at or above the glass transition temperature (Tg) or melting temperatures of the materials. The polymeric release material and the olefin-based polymer are compatibilized using a compatibilization scheme. As used herein the term "compatibilization scheme" refers to the method by which the olefin-based polymer and the polymeric release material are made to be compatible with one another due to a modification of their interfacial interactions. The compatibilization scheme comprises functionalizing the polymeric release material and olefin-based polymer in such a way that an acid-base interaction is present between the two materials. The acid-base interaction that is present between the polymeric release material and the olefin-based polymer may be described as a Lewis acid-base type interaction. Lewis acid-base interactions require that one chemical component be an electron acceptor (acid) and the other an electron donor (base). The electron donor provides an unshared pair of electrons and the electron acceptor furnishes an orbital system that can accommodate the additional unshared pair of electrons. The following general equation describes the Lewis acid-base interaction:

A (acid)+:B (base)→A:B (acid-base complex).

The acid-base interactions between the polymeric release material and the olefin-based polymer reduce their interfacial tension leading to a reduction in the dispersed phase particle size, and a stabilization of the multiphase morphology. Advantageously, due to their compatibilized nature, release compositions of the present invention may be extrudable without pre-mixing the various components making up the release composition. That is, the olefin-based polymer, polymeric release material, and diluent polymer (if present) can be fed directly into a single screw extruder without the need to first pre-blend the materials using high shear melt mixing. The acid-base interactions between the polymeric release material and the olefin-based polymer also result in increased adhesion between the constituents of the blend. Therefore, release compositions of the present invention may be resistant to the transfer of the polymeric release material, for example, to a pressure sensitive adhesive removed from a release layer of the release composition.

It is to be understood that either the olefin-based polymer or the polymeric release material can contain the acid or the base functionality. For example, an acid functionalized olefin-based polymer can be paired with a base functionalized polymeric release material. Alternatively, a base functionalized polymeric release material can be paired with an acid functionalized olefin-based polymer.

Figure 1:
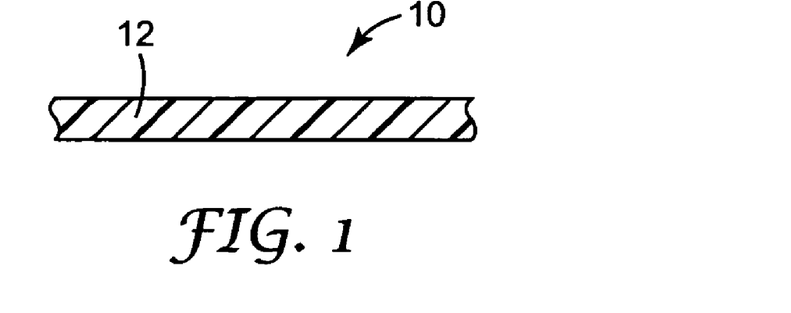
FIG. 1 is a cross-sectional view of one embodiment of a release article of the present invention.

Referring now to FIG. 1, an embodiment of a release article of the present invention is shown. Release film 10 comprises a single extruded release layer 12 comprising a release composition of the present invention.

Figure 2:
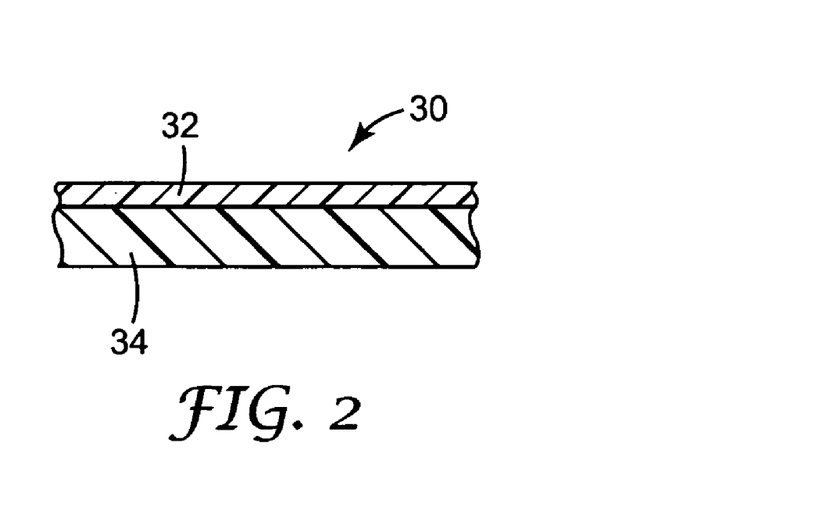
FIG. 2 is a cross-sectional view of one embodiment of a release article of the present invention.

In another embodiment as shown in FIG. 2, release article 30 includes release layer 32 and substrate 34. Release layer 32 comprises a release composition of the present invention. Substrate 34 may impart, for example, thickness, heat stability, U.V. stability, barrier properties, adhesion, anti-slip, anti-block, and/or conformance to release film 30. Substrate 34 is preferably a thermoplastic polymer that is co-extruded with release layer 32. Alternatively, release layer 32 may be coated (e.g., hot-melt or solvent) or extruded onto preexisting substrate 34 to provide release film 30.

Figure 2A:
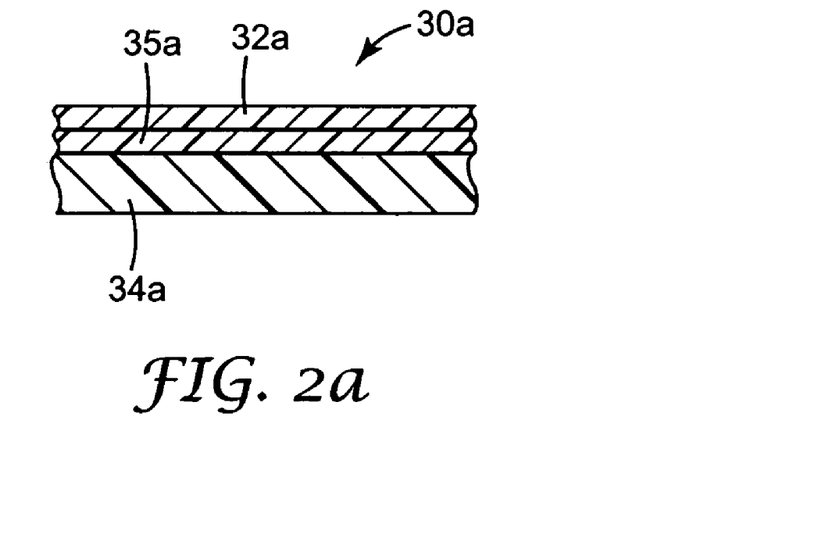
FIG. 2a is a cross-sectional view of one embodiment of a release article of the present invention.

In another embodiment, as shown in FIG. 2a release article 30a includes release layer 32a and substrate 34a. Interposed between release layer 32a and substrate 34a is tie layer 35a. Tie layer 35a functions to improve the adhesion between release layer 32a and substrate 34a.

Figure 3:
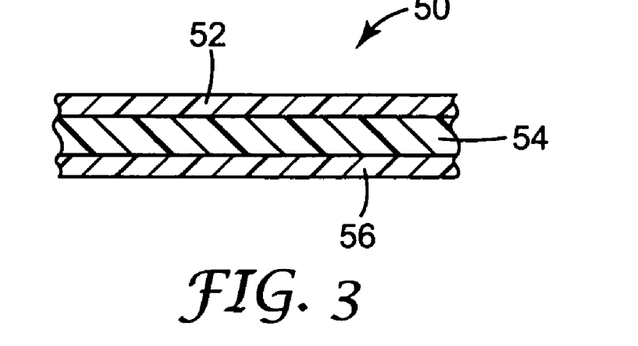
FIG. 3 is a cross-sectional view of one embodiment of a release article of the present invention.

In another embodiment, as shown in FIG. 3, release article 50 includes a first release layer 52 on substrate 54 and a second release layer 56 on substrate 54 opposite the first release layer 52. Second release layer 56 may be the same or different release composition that first release layer 52. At least one of first release layer 52 or second release layer 56 comprises a release composition of the present invention. If the first release layer 52 or the second release layer 56 is not a release composition of the present invention, that release layer may comprise any know conventional polymeric release material. Optionally, the release article of FIG. 3 may have differential release. In order to achieve differential release, first release layer 52 has a release value that differs from that of second release layer 56. For example, first release layer 52 may have a "tight" release and second release layer 56 may have an "easy" release.

Release compositions of the present invention may be used as release layers in adhesive articles, for example, pressure sensitive adhesive tapes. When used in pressure sensitive adhesive tapes, release layers of the present invention may be referred to as low adhesion backsize layers or LABs.

Figure 4:
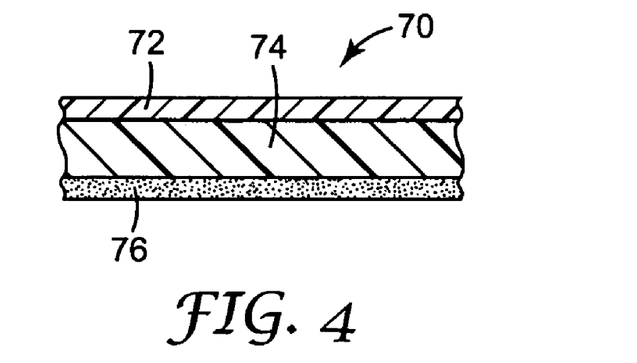
FIG. 4 is a cross-sectional view of one embodiment of an adhesive article of the present invention.

FIG. 4 shows one embodiment of a pressure sensitive adhesive tape 70 including release layer 72 situated on one surface of substrate 74 and adhesive layer 76 situated on the opposite surface of substrate 74. The pressure sensitive adhesive tape may be formed by co-extruding release layer 72 with substrate 74, followed by coating adhesive layer 76 on the other side of substrate 74 in a separate coating operation. Adhesive layer 76 may be coated, for example, by a hot-melt or solvent coating process. Alternatively, release layer 72 may be coated onto pre-existing substrate 74 in a first coating operation followed by application of adhesive layer 76 in a second coating operation. Further alternatively, release layer 72 along with substrate 74 and adhesive layer 76 may be simultaneously co-extruded to provide pressure sensitive adhesive tape 70.

Figure 5:
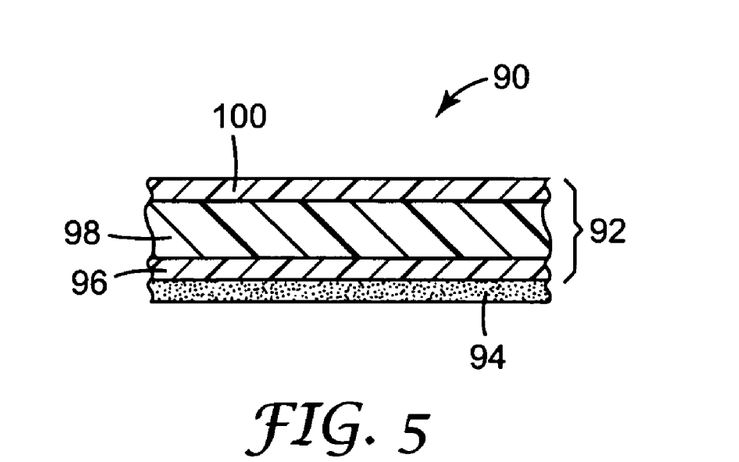
FIG. 5 is a cross-sectional view of one embodiment of an adhesive article of the present invention.

Multi-layered films may be co-extruded to provide useful backings for pressure sensitive adhesive tapes, for example, duct tapes, packaging tapes, medical tapes and the like. For example, a useful pressure sensitive adhesive tape can be formed from a backing comprising a three-layer film of the present invention. Referring now to FIG. 5, adhesive tape 90 includes backing 92 and pressure sensitive adhesive layer 94. Backing 92 comprises first layer 96, second layer 98, and third layer 100. Third layer 100 is a release layer comprising a release material of the present invention. First layer 96 and second layer 98 may provide thickness, heat stability, U.V. stability, barrier properties, adhesion, anti-slip, anti-block, and/or conformance to backing 92. In a preferred embodiment, backing 92 is produced by co-extruding a release material of the present invention to form third layer 100 along with first layer 96 and second layer 98. Such a backing may be produced, for example, using the process shown in FIG. 6.

Single (see, e.g., FIG. 1) and multi-layered release articles (see, e.g., FIGS. 2-3) and adhesive articles (see, e.g., FIG. 5) may be prepared, for example, using blown-film, cast-film or other extrusion techniques known to those of skill in the art. Typically, a minor amount of a polymeric release material is dry blended and extruded with a major amount of olefin-based polymer. If a diluent polymer is present, then the olefin-based polymer and diluent polymer form a major amount relative to the polymeric release material. In some embodiments, the extruded article is hot-stretched in a known manner to provide a machine-direction orientation (MDO) to the film. In other embodiments, the extruded film is biaxially oriented, for example, by machine-direction orientation along with cross-direction orientation. Stretching of the extruded film may improve mechanical properties of the extruded film (e.g., modulus and strength) and may allow a greater area of film to be produced from a given quantity of material.

Figure 6:
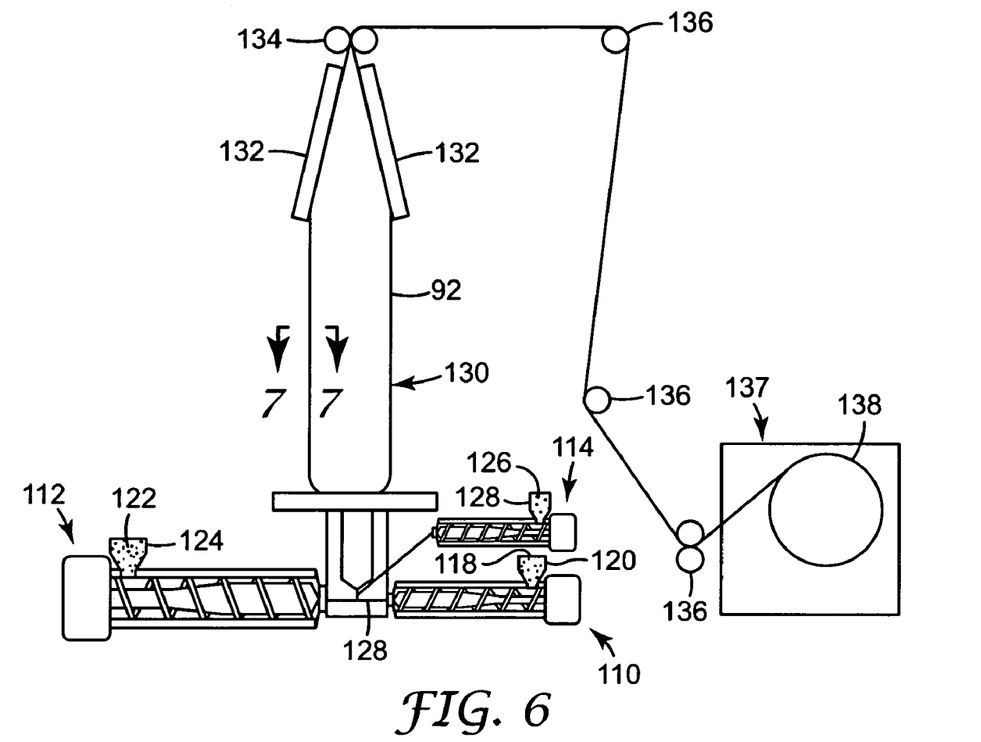
FIG. 6 is a schematic representation of a process for manufacturing articles of the present invention.
Figure 7:
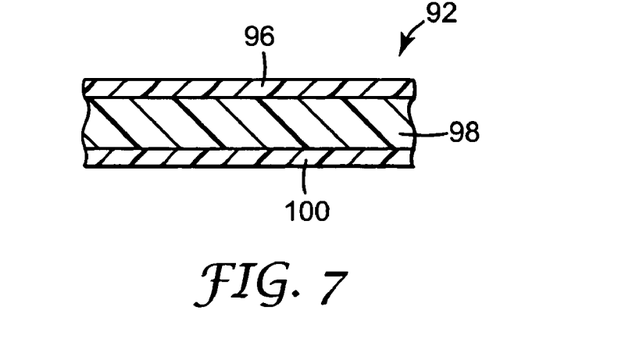
FIG. 7 is a sectional view of the backing of FIG. 6 taken along line 7-7.

Referring now to FIG. 6 a schematic representation of a blown film extrusion process useful for producing a backing 92 for an adhesive article of the present invention is shown. The blown film process includes three single screw extruders 110, 112, and 114 which simultaneously feed 3-layer extrusion die 116. Extruder 110 is loaded with first polymer composition 118 through hopper 120. Extruder 112 is loaded with second polymer composition 122 through hopper 124. Extruder 114 is loaded with compatibilized release composition 126 through hopper 128. In certain embodiments, the compatibilized release composition is fed into hopper 128 as a dry blended mixture of polymeric release material, pellets of olefin-based polymer, and optionally pellets of diluent polymer. In this way, high shear melt mixing to provide a homogeneous pelletized feed of the compatibilized release composition is not required. Alternatively, rather than dry blending, the components of the compatibilized release composition may be individually metered as they are fed into hopper 128. In operation, extruders 110, 112, and 114 simultaneously feed first polymer composition 118, second polymer composition 122, and compatibilized release composition 126, respectively, through runners 128 and into 3-layer extrusion die 116. Extrusion die 116 forms a 3-layer backing 92 in the form of an annular-shaped bubble 130. Annular bubble 130 is fed through collapsing frame 132 and nip rolls 134 where the annular bubble 130 is collapsed. Backing 92 is then fed through a series of rollers 136 and is wound into roll 138 at winder 137. Referring now to FIG. 7 a cross-section of backing 92 is shown. Backing 92 includes first layer 96, second layer 98, and third layer 100. First layer 96 and second layer 98 together form the substrate layer of backing 92. Third layer 100 is the release layer of backing 92 comprising the release composition of the present invention.

Components making up the release compositions, release articles and adhesive articles of the present invention are more fully described below.

Olefin-based Polymer:

Release compositions of the present invention comprise an olefin-based polymer that is functionalized in order to provide an acid-base interaction with the polymeric release material in accordance with the compatibilization scheme. Suitable olefin-based polymers are thermoplastic polymers that comprise at least an acid or a base functionality. As used herein the term "thermoplastic" is used to refer to a polymer material that softens to a melt-processable state when exposed to heat and returns to its original condition when cooled. As used herein the term "olefin-based" refers to a polymer that is derived from one or more olefins, for example, ethylene, propylene, butene, and/or isoprene.

The thermoplastic olefin-based polymer includes an acid or a base that is chemically bonded to the polymer chain. Acid functionality may be incorporated into olefin-based polymers, for example, by co-polymerizing olefins with acid-containing monomers, for example, acrylic acid, methacrylic acid, maleic acid, fumaric acid, phenolic, and chlorinated groups. Preferably, acid functionality is incorporated by co-polymerizing olefins with acrylic acid or methacrylic acid. Base functionality may be incorporated into thermoplastic olefin-based polymers, for example, by co-polymerizing olefins with monomers having basic groups such as amides, amines (including heterocyclic monomers such as vinyl pyridine, vinyl pyrolidone) and vinyl acetate.

Typically, the monomer providing the acid or base functionality will be included in the thermoplastic olefin-based polymer in an amount ranging from about 3% to about 30% by weight of the polymer. For ethylene/acrylic acid copolymers, the acid functionality is typically included in an amount ranging from about 6% to about 10% by weight of the copolymer.

Representative examples of thermoplastic olefin-based polymers include, for example, ethylene/acrylic acid copolymers, ethylene/methacrylic acid copolymers, acid-modified ethylene/vinyl acetate copolymers, and ethylene/vinyl acetate.

In order to provide extrudable release compositions it is generally preferable to process at a temperature that permits efficient extrusion and yet does not degrade the release material. The temperature of processing is generally dependent upon the method of forming the release composition. When the release layer is extrusion coated on a preformed substrate, the processing temperature of the release layer is independent of other layers. When co-extrusion processing is used, for example in blown film extrusion, the co-processed layers are generally extruded from the die at similar temperatures. For release compositions of the present invention, it is generally preferred that the thermoplastic olefin-based polymer can be extruded at a temperature less than about 200° C., more preferably less than 190° C. Preferably, the olefin-based polymer can be extruded at a temperature ranging from about 165° C. to about 185° C. If the extrusion temperature of the release composition is too high, the acid and base groups present to compatibilize the release composition may react with one another (e.g., carboxylic acid groups may react with amine groups to form amides) forming a crosslinked composition that is difficult or impossible to extrude.

Suitable thermoplastic olefin-based polymers include the ethylene/acrylic acid copolymers commercially available under the trade designations "PRIMACOR 3440" and "PRIMACOR 3460" from Dow Chemical Company, Midland Mich. PRIMACOR 3440 comprises about 9% by weight acrylic acid and has a melt flow index of 10. PRIMACOR 3460 comprises about 9% by weight acrylic acid and has a melt flow index of 20. Suitable ethylene/methacrylic acid copolymers are commercially available under the trade designation "NUCREL" from DuPont Chemical Co., Wilmington Del. Suitable acid-modified ethylene/vinyl acetate copolymers are commercially available under the trade designations "BYNEL 1124". Other suitable olefin-based polymers include polymers that have base functionality such as ethylene/vinyl acetate copolymers. Suitable commercially available ethylene/vinyl acetate include "ELVAX 3185" from DuPont.

The thermoplastic olefin-based polymer is typically present in the release composition in an amount ranging from about 1% to about 99% by weight of the release composition, more typically about 70% to about 99% by weight of the release composition. If a diluent polymer is present, then the thermoplastic olefin-based polymer is typically present in an amount ranging from about 1% to about 60% by weight of the release composition with the diluent polymer typically being present in an amount ranging from about 40% to 98% by weight of the release composition, and the polymeric release material being present in an amount ranging from about 1% to 30% by weight of the release composition.

Polymeric Release Material:

Release compositions of the present invention include a polymeric release material that includes an acid or a base functionality. The acid or base functionality is selected to provide an acid-base interaction with the olefin-based polymer according to the compatibilization scheme. For example, if the olefin-based polymer is acid functionalized then suitable polymeric release materials will be base functionalized in order to provide for an acid-base interaction between the olefin-based polymer and the polymeric release material. Similarly, if the thermoplastic olefin-based polymer is base functionalized then suitable polymeric release materials will be acid functionalized.

Representative examples of polymeric release materials include polyvinyl N-alkyl carbamates, polyvinyl N-alkyl carbamides, poly alkyl(meth)acrylate copolymers, silicone polyurea segmented copolymers, and siloxane-acrylate block or graft copolymers.

Polyvinyl N-alkyl carbamates and polyvinyl alkyl carbamides are random copolymers that may be represented by formula (I):

where: a and b are selected to provide the desired release characteristics and other desired properties, with the proviso that a≠0;

E is, independently,

G is, independently, n is 11 to 21; preferably n=17.

Polyvinyl N-alkyl carbamates are described, for example, in U.S. Pat. No. 2,532,011 (Dalquist et al.), the disclosure of which is incorporated herein by reference. Representative examples of polyvinyl N-alkyl carbamates include polyvinyl octadecyl carbamate, which is commercially available under the trade designations "ESCOAT P20" from Anderson Development Co. (Adrian, Mich.) and "MAYZO 95H"

available from Mayzo Inc. (Norcross, Ga.). Typically, polyvinyl octadecyl carbamate release material has a molecular weight from about 50,000 to about 300,000 grams/mole. Polyvinyl alkyl carbamide release materials include the polyethyleneimine alkyl carbamide commercially available under the designation "MAYZO RA-60R" from Mayzo Inc.

Polyvinyl alkyl carbamate release materials and polyvinyl alkyl carbamide release materials provide base functional groups (e.g., urethanes or ureas) and are appropriately paired with olefin-based polymers comprising acid functional groups according to the compatibilization scheme. One suitable olefin-based polymer for use with polyvinyl alkyl carbamate release materials is a copolymer of ethylene/acrylic acid.

Poly alkyl(meth)acrylate copolymer release materials may be described generally as copolymers including at least one higher alkyl (meth)acrylate and at least one acid monomer or one basic monomer. For example, a poly alkylacrylate release material may be prepared by the free-radical copolymerization of octadecyl acrylate with acrylic acid. The acrylic acid present in the release material provides acid functionality for compatibilization with the olefin-based polymer. Poly alkyl(meth)acrylates may be represented by general formula (II):

where: $R_1$ is, independently, —H or —CH$_3$;

$R_3$ is, independently, alkyl; aryl; —OH; —H; —CN;

where: $R_4$ is, independently, —H or alkyl;
n is 11 to 21; preferably n=17; and
d and e are selected to provide the desired release characteristics and other properties, with the proviso that d≠0.

Acid monomers include, for example, acrylic acid and methacrylic acid. When acid group monomers are used, the acid functionalized poly alkyl(meth)acrylate release material is appropriately paired with an olefin-based polymer that is base functionalized. Base group monomers include, for example, n-vinyl pyrolidone, N,N-dimethyl acrylamide, and acrylonitrile. When base group monomers are used, the base functionalized poly alkyl(meth)acrylate release material is appropriately paired with olefin-based polymers comprising acid functional groups. Other monomers may also be included in poly alkyl(meth)acrylate release materials, for example, methylacrylate, methylmethacrylate, and styrene. Poly alkyl(meth)acrylate release materials are described, for example, in U.S. Pat. No. 2,607,711 (Hendriks) and U.S. Pat. No. 3,011,988 (Luedke et al.), the disclosures of which are incorporated herein by reference.

Silicone polyurea segmented copolymer release materials are reported, for example, in U.S. Pat. No. 5,214,119 (Leir et al.), the disclosure of which is incorporated herein by reference. Silicone polyurea segmented copolymer release materials may be represented by formula (III):

where:
Z is a divalent radical selected from the group consisting of phenylene, alkylene, aralkylene and cycloalkylene;
Y is an alkylene radical of 1 to 10 carbon atoms;
$R_5$ is at least about 50% methyl or greater with the balance of the $R_5$ radicals being selected from the group consisting of monovalent alkyl radicals having from 2 to 12 carbon atoms, a substituted alkyl radical having 2 to 12 carbon atoms, a vinyl radical, a phenyl radical, and a substituted phenyl radical;
D is selected from the group consisting of hydrogen, and an alkyl radical of 1 to 10 carbon atoms;
B is selected from the group consisting of alkylene, aralkylene, cycloalkylene, phenylene, polyethylene oxide, polypropylene oxide, polytetramethylene oxide, polyethylene adipate, polycaprolactone, polybutadiene, and mixtures thereof, and a radical completing a ring structure including A to form a heterocycle;
A is selected from the group consisting of where $R_8$ is selected from the group consisting of hydrogen, and alkyl radical of 1 to 10 carbon atoms, phenyl, and a radical which completes a ring structure including B to form a heterocycle;
n is a number which is 10 or larger, and
m is a number which can be 0 to about 25.

The urea and/or urethane linkages in the compounds of formula (III) provide base functionality for compatibilization with acid functionalized olefin-based polymers according to the compatibilization scheme.

Siloxane-acrylate block copolymers may also be used as the polymeric release material in release compositions of the present invention. One example of siloxane-acrylate block copolymers are graft copolymers. A siloxane-acrylate graft copolymer may be prepared by free radical co-polymerization of compounds of formula (IV) with one or more vinyl monomers.

where: x>y;
x+y>20;
y is 1 or greater; and
$R_6$ is at least about 50% methyl or greater with the balance of the $R_6$ radicals being selected from the group consisting of monovalent alkyl radicals having from 2 to 12 carbon atoms, a substituted alkyl radical having 2 to 12 carbon atoms, a vinyl radical, a phenyl radical, and a substituted phenyl radical.

Representative examples of vinyl monomers include, for example, methyl methacrylate, butyl methacrylate, isobornylmethacrylate, methyl acrylate, vinyl acetate, n-vinyl pyrolidinone, acrylic acid, methacrylic acid, and the like. Acid or base functionalizing of the acrylate graft copolymers is introduced by appropriate choice of vinyl monomer(s). For example, acrylic acid or methacrylic acid will provide acid functional groups while n-vinyl pyrolidinone or vinyl acetate will provide base functional groups.

Other siloxane-acrylate graft copolymers may be prepared, for example, by reacting compounds of formula (V) by free radical co-polymerization with one or more vinyl monomers at least one of which is acidic or basic.

where: n is 10 or greater; and
$R_7$ is at least about 50% methyl or greater with the balance of the $R_7$ radicals being selected from the group consisting of monovalent alkyl radicals having from 2 to 12 carbon atoms, a substituted alkyl radical having 2 to 12 carbon atoms, a vinyl radical, a phenyl radical, and a substituted phenyl radical.

Siloxane-acrylate block copolymers are described, for example, in U.S. Pat. No. 4,728,571 (Clemens et al.), U.S. Pat. No. 5,229,179 (Kumar et al.), and U.S. Pat. No. 5,154,962 (Mertens et al.), the disclosures of which are incorporated herein by reference.

The polymeric release material is present in release compositions of the present invention in an effective amount for imparting the desired release force. The desired release force will usually depend upon the application in which the release layer is to be employed. For example, release compositions suitable for release layers in release articles will often include a higher concentration of polymeric release material than release compositions for release layers of adhesive articles. If the amount of polymeric release material in the release composition is too low, the release layer will not exhibit sufficiently low release force to be useful. If the amount of polymeric release material is too high, the adhesive may release too easily from the release layer. In addition, the cost of a release layer having a high concentration of release material may be cost prohibitive. Taking into account the above considerations, the polymeric release material is typically present in an amount ranging from about 1% to about 30% by weight of the release composition, more typically ranging from about 2% to about 10% by weight of the release composition, and most typically ranging from about 2% to about 5% by weight of the release composition. Amounts outside of these ranges may also be suitable in some instances.

The thickness of the release layer may be varied within a wide range. Generally, it is preferred to have the release layer be as thin as possible in order to minimize cost. It is also generally preferred that the release layer is a continuous layer, completely covering the substrate to which it is adhered. In this way, release from the surface of the release layer will be more consistent over the entire surface. Typically, the release layer extruded in a blown film process will have a thickness of about 2.5 μm or less. If the release layer is oriented subsequent to extrusion, then the final thickness of the release layer may be about 0.1 μm or less.

Diluent Polymer:

Release compositions of the present invention may optionally comprise a diluent polymer. When present, the diluent polymer typically replaces a portion of the olefin-based polymer to provide a release composition that may be more cost effective to manufacture and/or may have one or more improved properties. Suitable diluent polymers include, for example, polyolefins or polyolefin copolymers. Typically, the diluent polymer will be present in an amount ranging from about 40% to about 98% by weight of the release composition. An example of a diluent polymer is the low density polyethylene resin commercially available under the trade designation "LD 129" from Exxon Mobil Chemicals.

Tie Layer:

Release articles and adhesive articles of the present invention may optionally include a tie layer. Tie layers may be used, for example, to improve adhesion between a release layer and a substrate. Suitable tie layer compositions may be selected by one of skill in the art with reference to the composition of the two layers that are being bonded to one another with the tie layer. One versatile tie layer material is the acid-modified ethylene/vinyl acetate copolymer commercially available under the trade designation "BYNEL 1124" from DuPont Chemical Company. Other tie layer compositions are commercially available from DuPont Chemical Company.

Substrate:

Release compositions of the present invention may be used as release layers in release articles and adhesive articles that include a substrate, for example, a sheet, fiber, or shaped object. One preferred type of substrate is that which is used for adhesive coated articles (e.g., pressure sensitive adhesive coated articles) such as tapes (e.g., duct tapes, packaging tapes, and medical tapes), labels, bandages, and the like. The release composition of the invention can be applied to at least a portion of at least one major surface (preferably the entire major surface) of suitable flexible or inflexible substrate materials.

Representative examples of flexible substrate materials include paper, metal foil, polymer (e.g., in the form of a film or sheet) such as homopolymers, copolymer, and terpolymers of polyethylene, polypropylene (including biaxially oriented polypropylene), polybutylene, polyamide, polyvinylchloride, polycarbonate, polytetrafluoroethylene, polyester (e.g., polyethylene terephthalate), cellulose acetate; woven materials (e.g., woven fabric formed of threads of synthetic fibers, or natural materials such cotton or blends thereof); nonwoven materials such as nonwoven fabrics (e.g., air-laid webs of synthetic or natural fibers or blends thereof); and the like. Representative examples of inflexible substrates, which may be in the form of foils or sheets, include metals such as aluminum and stainless steel, glass and ceramic materials. Optionally, a primer or tie layer may be utilized in order to aid in the adhesion of the release compostion to the substrate. Optionally, the substrate may be oriented, for example, biaxially oriented.

When preparing articles comprising release compositions of the present invention, the substrate may be selected from a wide variety of materials to achieve a support layer for the release composition. For example, when the release composition is co-extruded with the substrate, the substrate typically comprises a thermally processible polymer such as a thermoplastic polymer. Representative examples include polyolefins (e.g., polyethylene, polypropylene, polybutylene, and the like); polyamides (e.g., nylon); polystyrene; polyester and copolyester; polyvinyl chloride; polyethylene vinyl acetate; copolymers (e.g., ethylene/propylene copolymers, ethylene/butylene copolymers, ethylene/hexane copolymers, ethylene/octane copolymers, propylene/butylene copolymers, and rubber block copolymers); polymethyl methacrylate; and mixtures and copolymers thereof. Preferred materials for the substrate include polypropylene, polyethylene, and copolymers or mixtures thereof.

When the release composition of the invention is extrusion coated onto a pre-existing substrate, the substrate may be selected from the list of thermoplastic materials identified above. Additionally, the substrate may be selected from non-thermoplastic polymers, metals, cloth, non-woven webs, polymeric foam, ceramic, paper, foil, laminates of the foregoing, and the like.

Adhesives:

Pressure sensitive adhesives useful in adhesive articles of present invention include those based on natural rubbers, synthetic rubbers, styrene block copolymers, polyvinyl ethers, acrylics, poly-α-olefins, silicones, urethanes or ureas.

Useful natural rubber pressure sensitive adhesives generally contain masticated natural rubber, from 25 parts to 300 parts of one or more tackifying resins to 100 parts of natural rubber, and typically from 0.5 to 2.0 parts of one or more antioxidants. Natural rubber may range in grade from a light pale crepe grade to a darker ribbed smoked sheet and includes such examples as CV-60 a controlled viscosity rubber grade and SMR-5 a ribbed smoked sheet rubber grade.

Tackifying resins used with natural rubbers generally include but are not limited to wood rosin and its hydrogenated derivatives; terpene resins of various softening points, and petroleum-based resins, such as, the "ESCOREZ 1300" series of C5 aliphatic olefin-derived resins from Exxon, and "PICCOLYTE S" series, polyterpenes from Hercules, Inc. Antioxidants are used to retard the oxidative attack on natural rubber, which can result in loss of the cohesive strength of the natural rubber adhesive. Useful antioxidants include but are not limited to amines, such as N-N'di-β-naphthyl-1,4-phenylenediamine, available as "AGERITE D"; phenolics, such as 2,5-di-(t-amyl) hydroquinone, available as "SANTOVAR A", available from Monsanto Chemical Co., tetrakis[methylene 3-(3',5'-di-tert -butyl-4'-hydroxyphenl)Propianate]methane, available as "IRGANOX 1010" from Ciba-Geigy Corp., and 2-2'-methylenebis(4-methyl-6-tert butyl phenol), available as Antioxidant 2246; and dithiocarbamates, such as zinc dithiodibutyl carbamate. Other materials can be added to natural rubber adhesives for special purposes, wherein the additions can include plasticizers, pigments, and curing agents to partially vulcanize the pressure sensitive adhesive.

Another useful class of pressure sensitive adhesives are those comprising synthetic rubber. Such adhesives are generally rubbery elastomers, which are either self-tacky or non tacky and require tackifiers.

Self-tacky synthetic rubber pressure sensitive adhesives include for example, butyl rubber, a copolymer of isobutylene with less than 3 percent isoprene, polyisobutylene, a homopolymer of isoprene, polybutadiene, such as "TAKTENE 220 BAYER" or styrene/butadiene rubber. Butyl rubber pressure sensitive adhesives often contain an antioxidant such as zinc dibutyl dithiocarbamate. Polyisobutylene pressure sensitive adhesives do not usually contain antioxidants. Synthetic rubber pressure sensitive adhesives, which generally require tackifiers, are also generally easier to melt process. They comprise polybutadiene or styrene/butadiene rubber, from 10 parts to 200 parts of a tackifier, and generally from 0.5 to 2.0 parts per 100 parts rubber of an antioxidant such as "IRGANOX 1010". An example of a synthetic rubber is "AMERIPOL 1011A", a styrene/butadiene rubber available from BF Goodrich. Tackifiers that are useful include derivatives of rosins such as "FORAL 85", a stabilized rosin ester from Hercules, Inc., the "SNOWTACK" series of gum rosins from Tenneco, and the "AQUATAC" series of tall oil rosins from Sylvachem; and synthetic hydrocarbon resins such as the "PICCOLYTE A" series, polyterpenes from Hercules, Inc., the "ESCOREZ 1300" series of $C_5$ aliphatic olefin-derived resins, the "ESCOREZ 2000" Series of $C_9$ aromatic/aliphatic olefin-derived resins, and polyaromatic $C_9$ resins, such as the "PICCO 5000" series of aromatic hydrocarbon resins, from Hercules, Inc. Other materials can be added for special purposes, including hydrogenated butyl rubber, pigments, plasticizers, liquid rubbers, such as "VISTANEX LMMH" polyisobutylene liquid rubber available from Exxon, and curing agents to vulcanize the adhesive partially.

Styrene block copolymer pressure sensitive adhesives generally comprise elastomers of the A-B or A-B-A type, where A represents a thermoplastic polystyrene block and B represents a rubbery block of polyisoprene, polybutadiene, or poly(ethylene/butylene), and resins. Examples of the various block copolymers useful in block copolymer pressure sensitive adhesives include linear, radial, star and tapered styrene-isoprene block copolymers such as "KRATON D1107P", available from Shell Chemical Co., and "EUROPRENE SOL TE 9110", available from EniChem Elastomers Americas, Inc.; linear styrene-(ethylene-butylene) block copolymers such as "KRATON G1657", available from Shell Chemical Co.; linear styrene-(ethylene-propylene) block copolymers such as "KRATON G1750X", available from Shell Chemical Co.; and linear, radial, and star styrene-butadiene block copolymers such as "KRATON D1118X", available from Shell Chemical Co., and "EURO- PRENE SOL TE 6205", available from EniChem Elastomers Americas, Inc. The polystyrene blocks tend to form domains in the shape of spheroids, cylinders, or plates that causes the block copolymer pressure sensitive adhesives to have two phase structures. Resins that associate with the rubber phase generally develop tack in the pressure sensitive adhesive. Examples of rubber phase associating resins include aliphatic olefin-derived resins, such as the "ESCOREZ 1300" series and the "WINGTACK" series, available from Goodyear; rosin esters, such as the "FORAL" series and the "STAYBELITE" Ester 10 both available from Hercules, Inc.; hydrogenated hydrocarbons, such as the "ESCOREZ 5000" series, available from Exxon; polyterpenes, such as the "PICCOLYTE A" series; and terpene phenolic resins derived from petroleum or terpentine sources, such as "PICCOFYN A100", available from Hercules, Inc. Resins that associate with the thermoplastic phase tend to stiffen the pressure sensitive adhesive. Thermoplastic phase associating resins include polyaromatics, such as the "PICCO 6000" series of aromatic hydrocarbon resins, available from Hercules, Inc.; coumarone-indene resins, such as the "CUMAR" series, available from Neville; and other high-solubility parameter resins derived from coal tar or petroleum and having softening points above about 85° C., such as the "AMOCO 18" series of alphamethyl styrene resins, available from Amoco, "PICCOVAR 130" alkyl aromatic polyindene resin, available from Hercules, Inc., and the "PICCOTEX" series of alphamethyl styrene/vinyl toluene resins, available from Hercules. Other materials can be added for special purposes, including rubber phase plasticizing hydrocarbon oils, such as, "TUFFLO 6056", available from Lydondell Petrochemical Co., Polybutene-8 from Chevron, "KAYDOL", available from Witco, and "SHELL-FLEX 371", available from Shell Chemical Co.; pigments; antioxidants, such as "IRGANOX 1010" and "IRGANOX 1076", both available from Ciba-Geigy Corp., "BUTAZATE", available from Uniroyal Chemical Co., "CYANOX LDTP", available from American Cyanamid, and "BUTASAN", available from Monsanto Co.; antiozonants, such as "NBC", a nickel dibutyldithiocarbamate, available from DuPont; liquid rubbers such as "VISTANEX LMMH" polyisobutylene rubber; and ultraviolet light inhibitors, such as "IRGANOX 1010" and "TINUVIN P", available from Ciba-Geigy Corp.

Polyvinyl ether pressure sensitive adhesives are generally blends of homopolymers of vinyl methyl ether, vinyl ethyl ether or vinyl iso-butyl ether, or blends of homopolymers of vinyl ethers and copolymers of vinyl ethers and acrylates to achieve desired pressure sensitive properties. Depending on the degree of polymerization, homopolymers may be viscous oils, tacky soft resins or rubber-like substances. Polyvinyl ethers used as raw materials in polyvinyl ether adhesives include polymers based on: vinyl methyl ether such as "LUTANOL M 40", available from BASF, and "GANTREZ M 574" and "GANTREZ 555", available from ISP Technologies, Inc.; vinyl ethyl ether such as "LUTANOL A 25", "LUTANOL A 50" and "LUTANOL A 100"; vinyl isobutyl ether such as "LUTANOL I30", "LUTANOL I60", "LUTANOL IC", "LUTANOL I60D" and "LUTANOL I65D"; methacrylate/vinyl isobutyl ether/acrylic acid such as "ACRONAL 550 D", available from BASF. Antioxidants useful to stabilize the polyvinylether pressure sensitive adhesive include, for example, "IONOX 30" available from Shell, "IRGANOX 1010" available from Ciba-Geigy, and antioxidant "ZKF" available from Bayer Leverkusen. Other materials can be added for special purposes as described in BASF literature including tackifier, plasticizer and pigments.

Acrylic pressure sensitive adhesives generally have a glass transition temperature of about −20° C. or less and may comprise from 100 to 80 weight percent of a $C_3$-$C_{12}$ alkyl ester component such as, for example, isooctyl acrylate, 2-ethyl-hexyl acrylate and n-butyl acrylate and from 0 to 20 weight percent of a polar component such as, for example, acrylic acid, methacrylic acid, ethylene vinyl acetate, N-vinyl pyrrolidone and styrene macronier. Preferably, the acrylic pressure sensitive adhesives comprise from 0 to 20 weight percent of acrylic acid and from 100 to 80 weight percent of isooctyl acrylate. The acrylic pressure sensitive adhesives may be self-tacky or tackified. Useful tackifiers for acrylics are rosin esters such as "FORAL 85", available from Hercules, Inc., aromatic resins such as "PICCOTEX LC-55WK", aliphatic resins such as "PICCOTAC 95", available from Hercules, Inc., and terpene resins such as α-pinene and β-pinene, available as "PICCOLYTE A-115" and "ZONAREZ B-100" from Arizona Chemical Co. Other materials can be added for special purposes, including hydrogenated butyl rubber, pigments, and curing agents to vulcanize the adhesive partially.

Poly-α-olefin pressure sensitive adhesives, also called a poly(1-alkene) pressure sensitive adhesives, generally comprise either a substantially uncrosslinked polymer or a uncrosslinked polymer that may have radiation activatable functional groups grafted thereon as described in U.S. Pat. No. 5,209,971 (Babu, et al) which is incorporated herein by reference. The poly-α-olefin polymer may be self tacky and/or include one or more tackifying materials. If uncrosslinked, the inherent viscosity of the polymer is generally between about 0.7 and 5.0 dL/g as measured by ASTM D 2857-93 "Standard Practice for Dilute Solution Viscosity of Polymers". In addition, the polymer generally is predominantly amorphous. Useful poly-α-olefin polymers include, for example, $C_3$-$C_{18}$ poly(1-alkene) polymers, preferably $C_5$-$C_{12}$ α-olefins and copolymers of those with $C_3$ and more preferably $C_6$-$C_8$ and copolymers of those with $C_3$. Tackifying materials are typically resins that are miscible in the poly-α-olefin polymer. The total amount of tackifying resin in the poly-α-olefin polymer ranges between 0 to 150 parts by weight per 100 parts of the poly-α-olefin polymer depending on the specific application. Useful tackifying resins include resins derived by polymerization of $C_5$ to $C_9$ unsaturated hydrocarbon monomers, polyterpenes, synthetic polyterpenes and the like. Examples of such commercially available resins based on a $C_5$ olefin fraction of this type are "WINGTACK 95" and "WINGTACK 15" tackifying resins available from Goodyear Tire and Rubber Co. Other hydrocarbon resins include "REGALREZ 1078" and "REGALREZ 1126" available from Hercules Chemical Co., and "ARKON P115" available from Arakawa Chemical Co. Other materials can be added for special purposes, including antioxidants, fillers, pigments, and radiation activated crosslinking agents.

Silicone pressure sensitive adhesives comprise two major components, a polymer or gum, and a tackifying resin. The polymer is typically a high molecular weight polydimethylsiloxane or polydimethyldiphenylsiloxane, that contains residual silanol functionality (SiOH) on the ends of the polymer chain, or a block copolymer comprising polydiorganosiloxane soft segments and urea terminated hard segments. The tackifying resin is generally a three-dimensional silicate structure that is endcapped with trimethylsiloxy groups ($OSiMe_3$) and also contains some residual silanol functionality. Examples of tackifying resins include SR 545 from General Electric Co., Silicone Resins Division, Waterford, N.Y., and MQD-32-2 from Shin-Etsu Silicones of America, Inc., Torrance, Calif. Manufacture of typical silicone pressure sensitive adhesives is described in U.S. Pat. No. 2,736,721 (Dexter). Manufacture of silicone urea block copolymer pressure sensitive adhesive is described in U.S. Pat. No. 5,214,119 (Leir, et al). Other materials can be added for special purposes, including, pigments, plasticizers, and fillers. Fillers are typically used in amounts from 0 parts to 10 parts per 100 parts of silicone pressure sensitive adhesive. Examples of fillers that can be used include zinc oxide, silica, carbon black, pigments, metal powders and calcium carbonate.

Polyurethane and polyurea pressure sensitive adhesives useful in the invention include, for example, those disclosed in WO 00/75210 (Kinning et al.) and in U.S. Pat. No. 3,718,712 (Tushaus); U.S. Pat. No. 3,437,622 (Dahl); and U.S. Pat. No. 5,591,820 (Kydonieus et al.).

Adhesive compositions useful in adhesive articles of the present invention may be extrudable and may be co-extruded with release compositions of the present invention and optionally may be co-extruded with a substrate to form adhesive articles, for example, adhesive tapes.

Optional Ingredients:

In some embodiments it may be advantageous to include one or more fillers and/or colorants or whitening agents in the release articles or adhesive articles of the present invention. For example, fillers such as $CaCO_3$, mica, talc, $TiO_2$, and the like may be used to impart opacity, heat resistance, and other desirable properties to the articles. One preferred whitening agent is 2,5-thiophenediylbis(5-tert-butyl-1,3-benzoxazole) that is commercially available under the trade designation "UVITEX OB" from Ciba Chemicals, Tarrytown, N.Y. A whitening agent may be useful as a guide in determining the coverage of a release layer in a release article or adhesive article. For example, when viewed under ultraviolet light, the whitening agent in the release coating fluoresces allowing an observer to visually determine if the release layer completely covers that substrate. Suitable whitening agents will be stable at (or above) the extrusion temperature and will not chemically decompose or degrade during extrusion.

EXAMPLES

These examples are merely for illustrative purposes only and are not meant to be limiting on the scope of the appended claims. All parts, percentages, ratios, etc. in the examples and the rest of the specification are by weight unless indicated otherwise.

Table of Abbreviations

| | |
|---|---|
| BYNEL 1124 | An acid-modified ethylene/vinyl acetate copolymer, commercially available from DuPont Chemical Co.; Wilmington, DE |
| ESCOAT P20 | Polyvinyl octadecyl carbamate release resin commercially available from Anderson Development Company Adrian, MI |
| LDPE | Gray pigmented LD 129.24 low density polyethylene commercially available from Exxon Chemical, Houston, TX |
| PE Resin | Same as the LDPE described above without the gray pigment. |
| Polypropylene Film | Film prepared from Polypropylene 3445 |
| PRIMACOR 3440 | Ethylene/acrylic acid copolymer containing approximately 9% acrylic acid with a melt flow index of 10 commercially available from Dow Chemical, Midland, MI |
| PRIMACOR 3460 | Ethylene/acrylic acid copolymer containing approximately 9% acrylic acid with a melt flow index of 20 commercially available from Dow Chemical, Midland, MI |
| Test Tape 1 | 375 Box Sealing Tape commercially available from 3M Company, St. Paul, MN |
| Test Tape 2 | SCOTCH SATIN Tape commercially available from 3M Company, St. Paul, MN |
| Test Tape 3 | SCOTCH 141 Mailing Tape commercially available from 3M Company, St. Paul, MN |
| UVITEX OB | Whitening agent, commercially available from Ciba Speciality Chemicals; Tarrytown, NY |
| MAYZO 95H | Polyvinyl octadecyl carbamate release resin commerically available from Mayzo Company, Norcross, GA |
| ELVAX 3185 | An ethylene/vinyl acetate copolymer, commercially available from DuPont Chemical Co.; Wilmington, DE |
| Polypropylene 3445 | Polypropylene commercially available from Exxon Chemicals Houston, TX |

Test Methods

Release Force and Readhesion Testing

This peel adhesion test is similar to the test method described in ASTM D 3330-90 except that the stainless steel substrate was replaced by a glass substrate. Samples were prepared for release testing by attaching the non-release side of the film (the backing layer) to a glass plate using double-coated adhesive tape (commercially available from Minnesota Mining & Manufacturing Co.; St. Paul, Minn. under the trade designation STA 305). A 2.54-centimeter wide strip of a Test Tape was adhered to the release layer using 2 passes of a 2 kg hard rubber roller.

The tapes were either peeled immediately (initial release) or allowed to dwell for 1 week at RT (room temperature) or 49° C. (heat aged), prior to peeling to find the peel adhesion value for each tape. The peel force was measured using an IMASS slip/peel tester (Model 3M90 commercially available from Instrumentors Inc., Strongsville, Ohio) at a peel angle of 180° and a peel rate of 2.3 meters/minute (90 inches/minute).

Readhesion values were measured by taking the tapes peeled from the release surface and rolling them onto a clean glass plate. The readhesion samples were then peeled on the IMASS slip/peel tester (Model 3M90 commercially available from Instrumentors Inc., Strongsville, Ohio) at a peel angle of 180° and a peel rate of 2.3 meters/minute (90 inches/minute).

Peel adhesion of a previously non-bonded Test Tape sample to the clean glass plate was measured as the control adhesion. The readhesions are reported as the percentage of the control adhesion.

Unwind Test

The unwind test is very similar to the test method described in PSTC-8 or ASTM D3811, except that the average unwind force is reported instead of the maximum value. Rolls of 50.8 millimeter wide were mounted in an unwind fixture affixed to a Constant Rate of Extension machine (Instron Model 5544 Instron Corporation, 100 Royal Street, Canton, Mass.). Two successive unwind measurements were taken from each roll. Two tape rolls were evaluated for each release layer construction. Therefore, the reported values are the average of four measurements. The unwind forces for the tape rolls were measured at 0.3 meters/minute (12 inches/minute) unwind rate before and after heat aging for one week at 49° C.

180° Peel Adhesion

This peel adhesion test is similar to the test method described in ASTM D 3330-90. Adhesive tapes were cut into 1.27 centimeter by 15 centimeter strips. Each strip was then adhered to a stainless steel substrate using a 2-kilogram roller passed once over the strip. The bonded assembly dwelled at room temperature for about one minute and was tested for 180° peel adhesion using an IMASS slip/peel tester (Model 3M90 commercially available from Instrumentors Inc., Strongsville, Ohio) at a rate of 0.30 meters/minute (12 inches/minute) over a five second data collection time. Two samples were tested; the reported peel adhesion value is an average of the peel adhesion value from each of the two samples.

Examples 1-2

Step 1: Preparation of Release Blend:
90 parts PRIMACOR 3460 and 10 parts ESCOAT P20 (premixed with 0.05% by weight UVITEX OB) were dry blended to form a Release Material.

Step 2: Preparation of Release Coated Film:
Three-layer release film backings were prepared by coextruding the Release Material prepared in Step 1 from a single-screw extruder and a tie layer (BYNEL 1124 for Example 1 and PRIMACOR 3460 for Example 2) processed through a single-screw extruder at a temperature of 170-200° C. onto length-oriented Polypropylene Film. The film thus formed was width-oriented. A summary of the release material layer and tie layer are presented in Table 1.

Release Force testing was carried out on the film prepared in this way using the test method described above with Test Tapes 1 and 2.The Results are shown in Table 2.

Example 3

Step 1: Preparation of Release Blend:
90 parts PRIMACOR 3440 and 10 parts ESCOAT P20 (premixed with 0.05% by weight UVITEX OB) were dry blended to form a Release Material.

Step 2: Preparation of Release Coated Film:
Same for Example 1-2 except that PRIMACOR 3440 was used in place of PRIMACOR 3460 as the tie layer. A summary of the release material layer and tie layer are presented in Table 1.

Release Force testing was carried out on the film prepared in this way using the test method described above with Test Tapes 1 and 2. The Results are shown in Table 2.

Comparative Example C1

A three layer construction was prepared as for Examples 1-3 except that only ESCOAT P20 was used as the Release Material. The tie layer was BYNEL 1124. A summary of the release material layer and tie layer are presented in Table 1.

Release Force testing was carried out on the film prepared in this way using the test method described above with Test Tapes 1 and 2. The Results are shown in Table 2.

Example 4

Step 1: Preparation of Release Blend:
PRIMACOR 3460 was fed into the feed zone of a 30-millimeter diameter, counter-rotating twin-screw extruder having a 27:1 length-to-diameter ratio (Model MP2030TC, available from APV Chemical Machinery Inc.; Saginaw, Mich.) at a rate of 7.7 kilograms/hour (17 pounds/hour). The extruder had double-start, fully intermeshing screws through the first four zones and single-start fully intermeshing screws through the remaining zones. The screw rotation rate was 150 revolutions per minute. ESCOAT P20 premixed with 0.05% by weight UVITEX OB, was fed into the first zone at a rate of 0.90 kilograms/hour (2 pounds/hour) to give 10 weight % ESCOAT P20. The temperature profiles for all of the zones were set at 175° C. The resultant blended polymer strand was extruded into a 3-millimeter-diameter strand, quenched in an ice water bath, pelletized and collected.

Step 2: Preparation of Release Coated Film:
A two-layer release film backing was prepared by extruding the Release Material prepared in Step 1 from a single-screw without a "tie" layer onto Polypropylene Film. The film thus formed was simultaneously biaxially oriented. A summary of the release material layer is presented in Table 1.

Release Force testing was carried out on the film prepared in this way using the test method described above with Test Tapes 1 and 2. The Results are shown in Table 2.

Example 5

Step 1: Preparation of Release Blend:
PRIMACOR 3440 was fed into the feed zone of a 30-millimeter diameter, counter-rotating twin-screw extruder having a 27:1 length-to-diameter ratio (Model MP2030TC, available from APV Chemical Machinery Inc.; Saginaw, Mich.) at a rate of 7.7 kilograms/hour (17 pounds/hour). The extruder had double-start, fully intermeshing screws through the first four zones and single-start fully intermeshing screws through the remaining zones. The screw rotation rate was 150 revolutions per minute. ESCOAT P20 premixed with 0.05% by weight UVITEX OB, was fed into the first zone at a rate of 1.81 kilograms/hour (4 pounds/hour) to give 20 weight % ESCOAT P20. The temperature profiles for all of the zones were set at 175° C. The resultant blended polymer strand was extruded into a 3-millimeter-diameter strand, quenched in an ice water bath, pelletized and collected.

Step 2: Preparation of Release Coated Film:
Three-layer release film backings were prepared by coextruding the Release Material prepared in Step 1 from a single-screw and a "tie" layer of PRIMACOR 3440 processed through a single-screw extruder onto Polypropylene Film. The film thus formed was simultaneously biaxially oriented. A summary of the release material layer and tie layer are presented in Table 1.

Release Force testing was carried out on the film prepared in this way using the test method described above with Test Tapes 1 and 2. The Results are shown in Table 2.

Examples 6-7

Step 1: Preparation of Release Blend:

The same procedure described for Example 5 was followed with the ESCOAT P20 replaced by MAYZO 95H, the UVITEX OB used at 0.1% by weight and the reagent ratios shown in Table 1.

Step 2: Preparation of Release Coated Film:

The same procedure described for Example 5 was followed to prepare 3-layer release backings.

Release Force testing was carried out on the film prepared in this way using the test method described above with Test Tapes 1 and 2. The Results are shown in Table 2. Additionally Release Force testing was carried out with Test Tape 3 and these data are shown in Table 3.

Comparative Examples C2-C3

Step 1: Preparation of Release Blend:

The same procedure described for Example 5 was followed with the PRIMACOR 3440 replaced by Polypropylene 3445 or ELVAX 3185 and the reagent ratios shown in Table 1.

Step 2: Preparation of Release Coated Film:

The same procedure described for Example 5 was followed to prepare 3-layer release backings.

Release Force testing was carried out on the film prepared in this way using the test method described above with Test Tapes 1 and 2. The Results are shown in Table 2. Additionally Release Force testing was carried out with Test Tape 3 and these data are shown in Table 3.

TABLE 1

| Example | Release Material Description | Tie Layer |
|---|---|---|
| 1 | 90/10 PRIMACOR 3460/ESCOAT P20 | BYNEL 1124 |
| 2 | 90/10 PRIMACOR 3460/ESCOAT P20 | PRIMACOR 3460 |
| 3 | 90/10 PRIMACOR 3440/ESCOAT P20 | PRIMACOR 3440 |
| C1 | ESCOAT P20 | BYNEL 1124 |
| 4 | 90/10 PRIMACOR 3460/ESCOAT P20 | None |
| 5 | 80/20 PRIMACOR 3440/ESCOAT P20 | PRIMACOR 3440 |
| 6 | 90/10 PRIMACOR 3440/MAYZO 95H | PRIMACOR 3440 |
| 7 | 95/5 PRIMACOR 3440/MAYZO 95H | PRIMACOR 3440 |
| C2 | 96/4 Polypropylene3445/ESCOAT P20 | PRIMACOR 3440 |
| C3 | 90/10 ELVAX 3185/ESCOAT P20 | PRIMACOR 3440 |

TABLE 2

| Example | Test Tape 1 Release Force after RT 1 week in N/dm (Readhesion %) | Test Tape 1 Release Force after 49° C. 1 week in N/dm (Readhesion %) | Test Tape 2 Release Force after RT 1 week in N/dm (Readhesion %) | Test Tape 2 Release Force after 49° C. 1 week in N/dm (Readhesion %) |
|---|---|---|---|---|
| 1 | 1.3 (102) | 1.8 (99) | 6.6 (112) | 8.0 (106) |
| 2 | 1.9 (98) | 3.0 (103) | 10.0 (96) | 10.8 (93) |
| 3 | 1.8 (104) | 2.3 (100) | 7.5 (108) | 8.6 (98) |
| C1 | 4.8 (90) | 9.2 (84) | 8.4 (83) | 7.9 (90) |
| 4 | 1.8 (101) | 2.5 (98) | 7.1 (95) | 7.4 (87) |
| 5 | 1.8 (99) | 1.1 (111) | 7.4 (107) | 7.0 (111) |
| 6 | 2.1 (98) | 3.4 (99) | 7.8 (91) | 9.7 (89) |
| 7 | 2.3 (96) | 8.3 (94) | 9.7 (84) | 13.0 (83) |
| C2 | 56.3 (75) | 63.8 (71) | 26.4 (91) | 28.6 (97) |
| C3 | 15.4 (82) | 13.2 (84) | 14.4 (77) | 14.1 (84) |

TABLE 3

| Example | Test Tape 3 Release Force after RT 1 week in N/dm (Readhesion %) | Test Tape 3 Release Force after 49° C. 1 week in N/dm (Readhesion %) |
|---|---|---|
| 6 | 3.2 (97) | 4.0 (94) |
| 7 | 4.3 (94) | 9.3 (89) |
| C2 | 61.7 (76) | 60.1 (52) |
| C3 | 35.4 (74) | 14.8 (81) |

Examples 8-13 and Comparative Example C4

Release film backings of 63.5 micrometers (2.5 mils) in thickness were prepared on a blown film process line by using three single screw extruders to feed a three layer annular die to form the three layer film bubble. The melt temperatures in the extruders and the die were set at 175° C. The middle and one outer layer were composed of LDPE, while the other outer layer was composed of a PRIMACOR 3460/ESCOAT P20 release material blend. The thickness of the release layer was varied between 5% and 10% of the total film thickness. The 90/10 blend of PRIMACOR 3460/ESCOAT P20 prepared in Step 1 of Example 1 was dry blended with further PRIMACOR 3460 resin, and fed to the hopper of the extruder feeding the release layer, in order to get to achieve the levels of the ESCOAT P20 release component shown in Table 4. For Comparative Example C4 only PRIMACOR 3460 resin was used.

TABLE 4

| Example | Release Layer Composition Ratio of PRIMACOR 3460/ESCOAT P20 | Release Layer Thickness (% of total film thickness) |
|---|---|---|
| 8 | 98/2 | 7.5 |
| 9 | 97/3 | 10 |
| 10 | 95/5 | 10 |
| 11 | 90/10 | 5 |
| 12 | 97/3 | 7.5 |
| 13 | 96/4 | 7.5 |
| C4 | 100/0 | 7.5 |

Examples 14-16

The release film backings prepared in Examples 9-11 were made into tapes by rotary rod die coating a PSA and scrim to the Release Film at the PSA coat weight shown in Table 5. The PSA was a natural rubber/resin formulation comprised of natural rubber elastomer, tackifier, antioxidant and filler. The scrim was comprised of 100% polyester fibers in a multi-filament configuration with various fiber counts from 25×7 to 30×10. Unwind and 180° Peel adhesion to steel was carried out using the test methods described above. The results are shown in Table 6.

TABLE 5

| Example | Release Film Backing Example Number | PSA Coat Weight (grams/square meter) |
| --- | --- | --- |
| 14 | 9 | 128 |
| 15 | 10 | 140 |
| 16 | 11 | 193 |

TABLE 6

| | Unwind Force (N/dm) | | 180° Peel Adhesion to Steel (N/dm) | |
| --- | --- | --- | --- | --- |
| Example | RT aged 1 week | 49° C. aged 1 week | RT aged 1 week | 49° C. aged 1 week |
| 14 | 48 | 62 | 66 | 57 |
| 15 | 34 | 39 | 67 | 53 |
| 16 | 28 | 53 | 57 | 47 |

Examples 17-22

Release film backings of 63.5 micrometers (2.5 mils) in thickness were prepared on a blown film process line by using three single screw extruders feed a three layer annular die to form the three layer film bubble. The melt temperatures in the extruders and the die were set at 175° C. The middle and an outer layer were composed of LDPE, while the other outer layer was composed of a PE Resin/PRIMACOR 3460/ESCOAT P20 release material blend. The thickness of the release layer was 7.5% of the total film thickness. For Example 17 the 80/20 blend of PRIMACOR 3460/ESCOAT P20 prepared in Step 1 of Example 5 was dry blended with PE Resin and fed to the hopper of the extruder feeding the release layer, in order to achieve the composition ratio shown in Table 7. For Examples 18-22 all materials shown in Table 7 were dry blended and fed to the hopper.

TABLE 7

| Example | Release Layer Composition Ratio of PE Resin/PRIMACOR 3460/ESCOAT P20 | Release Layer Thickness (% of total film thickness) |
| --- | --- | --- |
| 17 | 80/16/4 | 7.5 |
| 18 | 76/20/4 | 7.5 |
| 19 | 86/10/4 | 7.5 |
| 20 | 91/5/4 | 7.5 |
| 21 | 92/5/3 | 7.5 |
| 22 | 90/5/5 | 7.5 |

Comparative Example C5

The same procedure used to prepare Examples 18-22 was followed except that the release layer was a blend of 95 parts PE Resin and 5 parts ESCOAT P20 without any PRIMACOR 3460. No further testing was possible with this composition, as a stable bubble could not be formed in the film making process and so it was not possible to make any film sample. With the mixing available in the Single Screw Extruder, this blend composition for this film layer was very splotchy and non-uniform and those defects were devastating to the film forming process.

Examples 23-30

The release film backings prepared in Examples 12-13 and 17-22 were made into tapes as described for Examples 14-16. Unwind and 180° Peel adhesion to steel testing was carried out using the test methods described above. The results are shown in Table 8.

TABLE 8

| Example | Release Film Backing Example Number | Unwind Force (N/dm) | | 180° Peel Adhesion to Steel (N/dm) | |
| --- | --- | --- | --- | --- | --- |
| | | Initial | 49° C. aged 1 week | Initial | 49° C. aged 1 week |
| 23 | 12 | 61.7 | 54.8 | 64.4 | 50.8 |
| 24 | 13 | 37.2 | 51.7 | 54.6 | 48.1 |
| 25 | 17 | 35.6 | 51.0 | 51.2 | 50.3 |
| 26 | 18 | 36.9 | 50.6 | 48.1 | 51.4 |
| 27 | 19 | 32.3 | 48.5 | 57.2 | 51.4 |
| 28 | 20 | 36.1 | 45.6 | 46.5 | 46.1 |
| 29 | 21 | 66.7 | 53.0 | 62.7 | 55.7 |
| 30 | 22 | 52.7 | 48.1 | 55.1 | 53.1 |

What is claimed is:

1. An adhesive article comprising:
   (a) a substrate having a first surface and a second surface;
   (b) a release layer covering at least a portion of the first surface of the substrate, the release layer comprising:
      a thermoplastic olefin-based polymer comprising an acid or a base functionality;
      a polymeric release material comprising an acid or a base functionality;
      wherein the functionality of the thermoplastic olefin-based polymer and the functionality of the polymeric release material form an acid-base interaction; and
      wherein the thermoplastic olefin-based polymer and the polymeric release material form a compatibilized blend; and
   (c) an adhesive layer covering at least a portion of the second surface of the substrate.

2. The adhesive article of claim 1, wherein the release layer further comprises a diluent polymer.

3. The adhesive article of claim 2, wherein the diluent polymer is a polyolefin or polyolefin copolymer.

4. The adhesive article of claim 1, wherein the adhesive layer comprises a pressure sensitive adhesive.

5. The adhesive article of claim 4, wherein the pressure sensitive adhesive layer comprises a pressure sensitive adhesive based on a natural rubber, synthetic rubber, tackified styrene block copolymer, polyvinyl ether, poly(meth)acrylate, poly-α-olefin, silicone, polyurethane, or a combination thereof.

6. The adhesive article of claim 1, wherein the substrate is a film having a first major surface and a second major surface, and wherein at least a portion of the first major surface is covered with the release layer and at least a portion of the second major surface is covered with the adhesive layer.

7. The adhesive article of claim 6, wherein the release layer and the substrate are co-extruded.

8. The adhesive article of claim 7, wherein the substrate is a film comprising a first layer and a second layer and wherein the first and the second layer comprise low-density polyethylene.

9. The adhesive article of claim 8, wherein the film is oriented.

10. The adhesive article of claim 1, further including a tie layer between the release layer and the substrate.

11. The adhesive article of claim 1, wherein the adhesive article is a pressure sensitive adhesive tape.

* * * * *